(12) United States Patent
Fukatani et al.

(10) Patent No.: US 8,367,216 B2
(45) Date of Patent: Feb. 5, 2013

(54) LAMINATE FOR LAMINATED GLASS AND INTERLAYER FILM FOR LAMINATED GLASS

(75) Inventors: Juichi Fukatani, Shiga (JP); Izumi Omoto, Shiga (JP); Seiko Ichikawa, Shiga (JP); Kouichi Tanaka, Tokyo (JP); Mayu Kameda, Tokyo (JP)

(73) Assignees: Sekisui Chemical Co., Ltd., Osaka (JP); Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 0 days.

(21) Appl. No.: 13/139,806

(22) PCT Filed: Dec. 22, 2009

(86) PCT No.: PCT/JP2009/071268
§ 371 (c)(1),
(2), (4) Date: Aug. 3, 2011

(87) PCT Pub. No.: WO2010/074046
PCT Pub. Date: Jul. 1, 2010

(65) Prior Publication Data
US 2012/0021230 A1    Jan. 26, 2012

(30) Foreign Application Priority Data
Dec. 22, 2008    (JP) .................................. 2008-326168

(51) Int. Cl.
*B32B 27/18*    (2006.01)
*B32B 27/42*    (2006.01)
*B32B 17/06*    (2006.01)

(52) U.S. Cl. ........ 428/524; 428/436; 428/437; 428/441; 428/442; 428/501

(58) Field of Classification Search .................. 428/436, 428/437, 441, 442, 501, 524
See application file for complete search history.

(56) References Cited

U.S. PATENT DOCUMENTS

| | | | |
|---|---|---|---|
| 6,259,559 B1 | 7/2001 | Kobayashi et al. | 359/485.01 |
| 7,160,624 B2 * | 1/2007 | Fukatani et al. | 428/437 |
| 2004/0234778 A1 | 11/2004 | Fukatani et al. | 428/426 |

FOREIGN PATENT DOCUMENTS

| | | |
|---|---|---|
| JP | 8-259280 | 10/1996 |
| JP | 10-96874 | 4/1998 |
| JP | 2003-327455 | 11/2003 |
| WO | 03/018502 | 3/2003 |

OTHER PUBLICATIONS

International Search Report issued Jan. 26, 2010 in International (PCT) Application No. PCT/JP2009/071268.

* cited by examiner

*Primary Examiner* — D. S. Nakarani
(74) *Attorney, Agent, or Firm* — Wenderoth, Lind & Ponack, L.L.P.

(57) ABSTRACT

A laminate for a laminated glass which is used as a head-up displays (HUD) and is not deteriorated even if exposed to light, and with which a laminated glass having excellent impact resistance can be prepared, wherein an interlayer film for a laminated glass and a retardation element sandwiched between adhesive layers are laminated, the interlayer film for a laminated glass contains a thermoplastic resin and an ultraviolet absorber, the interlayer film for a laminated glass contains, as the ultraviolet absorber, a benzotriazole compound or a benzophenone compound, and at least one compound selected from the group consisting of a malonic ester compound, an oxanilide compound and a triazine compound.

13 Claims, 1 Drawing Sheet

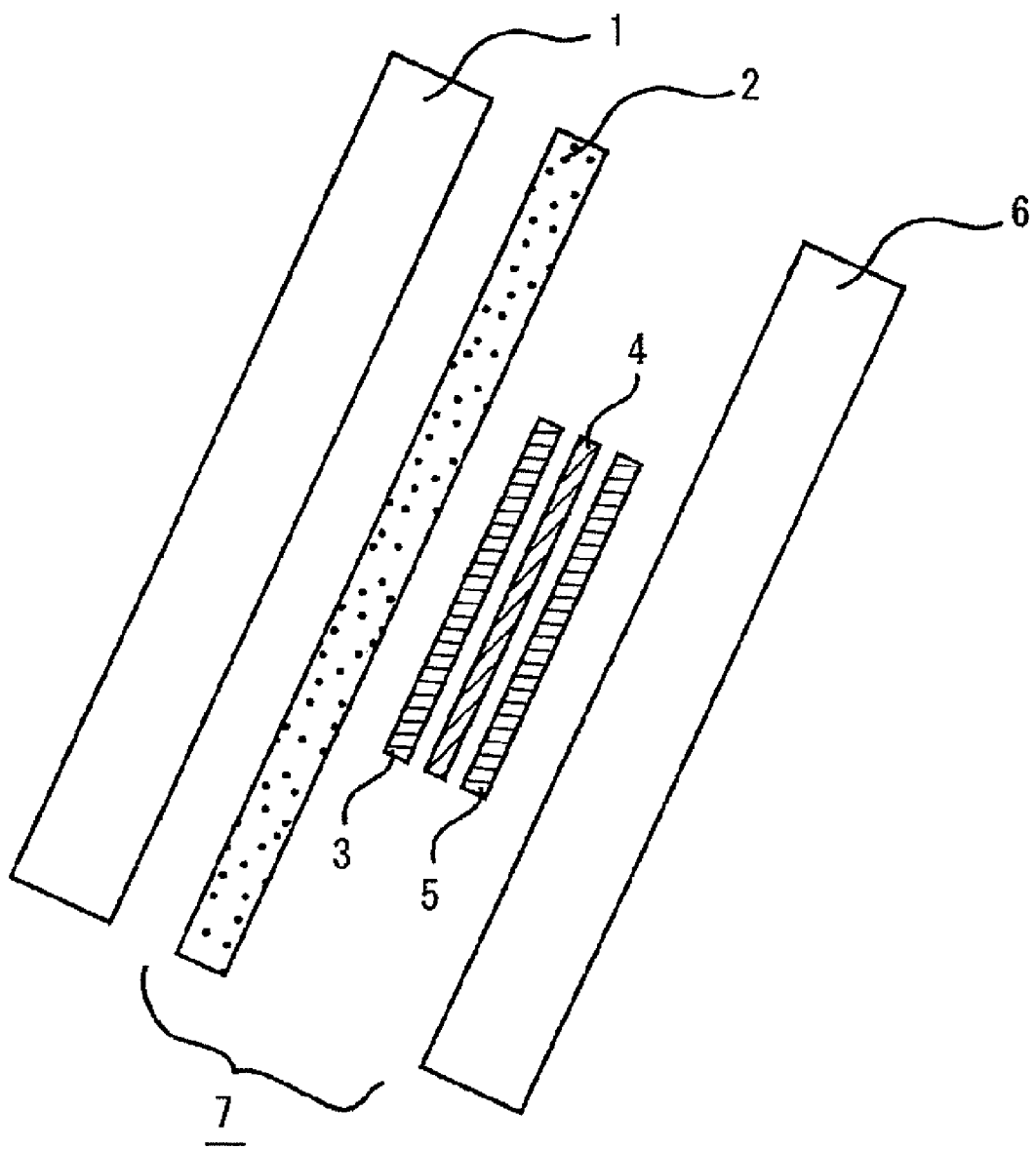

LAMINATE FOR LAMINATED GLASS AND INTERLAYER FILM FOR LAMINATED GLASS

This application is a U.S. national stage of International Application No. PCT/JP2009/071268 filed Dec. 22, 2009.

TECHNICAL FIELD

The present invention relates to a laminate for a laminated glass which is used as a head-up display (HUD) and is not deteriorated even if exposed to light, and with which a laminated glass having excellent impact resistance can be prepared. Further, the present invention relates to an interlayer film for a laminated glass to be used in the laminate for a laminated glass.

BACKGROUND ART

Laminated glasses, which are generally composed of two opposed glass sheets and interlayer films for a laminated glass sandwiched therebetween, are used in the front parts of automobiles, aircraft and the like as a so-called windshield.

In recent years, with respect to the windshield for an automobile, there is an increasing desire of displaying instrument display such as speed information and the like, which is automobile driving data, as a head-up display (HUD) in the same field of view as the windshield, for improving safety.

For example, there is proposed the form in which an HUD display section is not located at the surface of the windshield, and speed information and the like sent from a control unit are displayed in a display unit of an instrument panel section and this display is reflected off the surface of the windshield and thereby a driver visually recognizes the speed information and the like at the same position as the windshield, that is, in the same field of view as the windshield. Such a head-up display is disadvantageous in that instrument display in the driver's vision is doubly blurred since a laminated glass constituting the windshield is composed of two parallel glasses.

To cope with such a problem, in Patent Document 1, a laminated glass having a retardation element is disclosed. In this laminated glass, the retardation element is disposed between a glass on the vehicle exterior side and an interlayer film for a laminated glass, and the retardation element is bonded to the glass on the vehicle exterior side with an adhesive containing an ultraviolet absorber. However, the laminated glass has a problem that an ultraviolet absorbing power is insufficient and the retardation element is deteriorated when being exposed to light, and a problem that impact resistance thereof is insufficient.

PRIOR ART DOCUMENTS

Patent Documents

Patent Document 1: Japanese Kokai Publication Hei-8-259280 (JP-A H08-259280)

SUMMARY OF THE INVENTION

Problems to be Solved by the Invention

It is an object of the present invention to provide a laminate for a laminated glass which is used as a head-up display (HUD) and is not deteriorated even if exposed to light, and with which a laminated glass having excellent impact resistance can be prepared. Further, it is another object of the present invention to provide an interlayer film for a laminated glass to be used in the laminate for a laminated glass.

Means for Solving the Problems

The present invention provides a laminate for a laminated glass, wherein an interlayer film for a laminated glass and a retardation element sandwiched between adhesive layers are laminated, the interlayer film for a laminated glass contains a thermoplastic resin and an ultraviolet absorber, the interlayer film for a laminated glass contains, as the ultraviolet absorber, a benzotriazole compound or a benzophenone compound, and at least one compound selected from the group consisting of a malonic ester compound, an oxanilide compound and a triazine compound, the sum of the contents of the malonic ester compound, the oxanilide compound and the triazine compound is 0.8 parts by weight or more and the sum of the contents of the benzotriazole compound or the benzophenone compound is 0.8 parts by weight or more with respect to 100 parts by weight of the thermoplastic resin and the adhesive layer contains an adhesive having a glass transition temperature of $-20°$ C. or lower.

Hereinafter, the present invention will be described in detail.

The present inventors made intensive investigations and consequently found that, in a laminate for a laminated glass in which a interlayer film for a laminated glass and a retardation element sandwiched between adhesive layers are laminated, by making a certain amount of a specific ultraviolet absorber to be contained in the interlayer film for a laminated glass and by composing the adhesive layers with an adhesive having a specific glass transition temperature, it is possible to prepare a laminated glass, by using the resulting laminate for a laminated glass, which is used as a head-up display (HUD), is not deteriorated even if exposed to light, and has excellent impact resistance. These findings have now led to completion of the present invention.

In the laminate for a laminated glass of the present invention, an interlayer film for a laminated glass and a retardation element sandwiched between adhesive layers are laminated. Here, the size of the interlayer film for a laminated glass may be equal to or different from that of the retardation element, but the interlayer film for a laminated glass is preferably larger than the retardation element.

The interlayer film for a laminated glass contains a thermoplastic resin and an ultraviolet absorber. Thereby, the deterioration of the retardation element can be prevented even when a laminated glass formed by using the laminate for a laminated glass of the present invention is exposed to light.

The interlayer film for a laminated glass contains, as the ultraviolet absorber, a mixture of a benzotriazole compound or a benzophenone compound, and at least one compound selected from the group consisting of a malonic ester compound, an oxanilide compound and a triazine compound. By using such an ultraviolet absorber, particularly, the deterioration of the retardation element can be prevented.

The malonic ester compound preferably has an aromatic ring. Examples of the malonic ester compound having an aromatic ring include Hostavin PR-25 (produced by Clariant) represented by the following formula (1-1), Hostavin B-CAP (produced by Clariant) represented by the following formula (1-2), and the like.

[Formula 1]

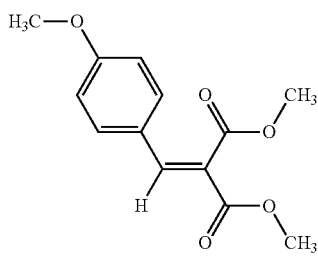

(1-1)

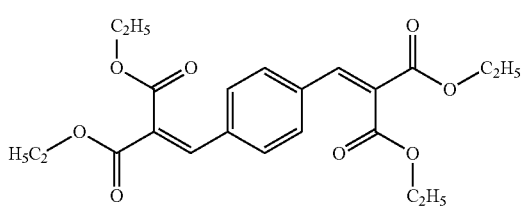

(1-2)

The oxanilide compound preferably has an aromatic ring. Examples of the oxanilide compound having an aromatic ring include Sanduvor VSU (produced by Clariant) represented by the following formula (2), and the like.

[Formula 2]

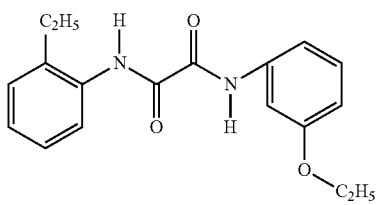

(2)

Examples of the triazine compound include a compound represented by the following formula (3), and the like.

In the formula (3), $R^{11}$ represents an organic group having 1 to 20 carbon atoms, $R^{12}$ represents a hydrogen atom, an alkyl group having 1 to 8 carbon atoms or an alkoxy group having 1 to 8 carbon atoms, and $R^{13}$ represents a hydrogen atom or a hydroxyl group.

Examples of commercialized products of the triazine compound include TINUVIN 400 (produced by Ciba-Geigy Ltd., $R^{11}$ is —CH$_2$CH(OH)CH$_2$—O—C$_{12}$H$_{25}$ or —CH$_2$CH(OH)CH$_2$—O—C$_{13}$H$_{27}$, $R^{12}$ is CH$_3$—, and $R^{13}$ is OH—), TINUVIN 405 (produced by Ciba-Geigy Ltd., $R^{11}$ is —CH$_2$CH(OH)CH$_2$—O—CH$_2$CH(C$_2$H$_5$)C$_4$H$_9$, $R^{12}$ is CH$_3$—, and $R^{13}$ is OH—), TINUVIN 460 (produced by Ciba-Geigy Ltd., $R^{11}$ is C$_4$H$_9$—$R^{12}$ is C$_4$H$_9$O—, and $R^{13}$ is OH—), TINUVIN 1577 (produced by Ciba-Geigy Ltd., $R^{11}$ is C$_6$H$_{13}$—, $R^{12}$ is H—, and $R^{13}$ is OH—), LA-46 (produced by Adeka Corporation, $R^{11}$ is CH$_3$CH$_2$CH$_2$—O—C(=O)—CH$_2$CH$_2$CH$_2$—, $R^{12}$ is H—, and $R^{13}$ is OH—), and the like.

In the formula (3), $R^{11}$ preferably represents an organic group having 3 to 16 carbon atoms. The organic group may be an alkyl group, or may be an organic group having an ether bond and a hydroxyl group therein or an organic group having an ester bond therein.

In the formula (3), $R^{12}$ is preferably a hydrogen atom, an alkyl group having 2 to 5 carbon atoms or an alkoxy group having 2 to 5 carbon atoms. In the formula (3), $R^{13}$ is preferably a hydroxyl group.

[Formula 3]

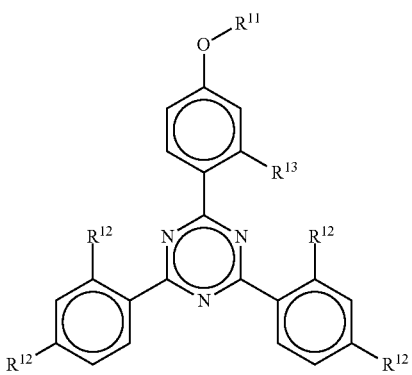

(3)

Examples of the benzotriazole compound include a compound represented by the following formula (4), and the like.

In the formula (4), $R^{14}$ represents a hydrogen atom or a halogen atom, $R^{15}$ represents an alkyl group having 3 to 10 carbon atoms, and $R^{16}$ represents an alkyl group having 1 to 10 carbon atoms.

Examples of commercialized products of the benzotriazole compound include TINUVIN 328 (produced by Ciba-Geigy Ltd., $R^{14}$ is H—, $R^{15}$ is CH$_3$CH$_2$C(CH$_3$)$_2$—, and $R^{16}$ is CH$_3$CH$_2$C(CH$_3$)$_2$—), TINUVIN 326 (produced by Ciba-Geigy Ltd., $R^{14}$ is Cl—, $R^{15}$ is CH$_3$C(CH$_3$)$_2$—, and $R^{16}$ is CH$_3$—), TINUVIN 234 (produced by Ciba-Geigy Ltd., $R^{14}$ is H—, $R^{15}$ is a 1-methyl-1-phenylethyl group, and $R^{16}$ is a 1-methyl-1-phenylethyl group), and the like.

In the formula (4), $R^{14}$ is preferably a hydrogen atom. In the formula (4), $R^{15}$ is preferably an alkyl group having 3 to 10 carbon atoms and a branching structure. In the formula (4), $R^{16}$ is preferably an alkyl group having 3 to 10 carbon atoms and a branching structure.

[Formula 4]

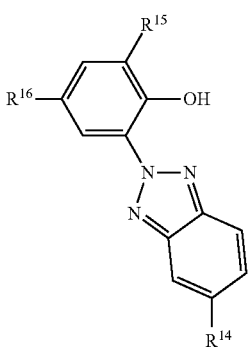

(4)

Examples of the benzophenone compound include a compound represented by the following formula (5), and the like.

In the formula (5), $R^{17}$ represents a hydrogen atom, a hydroxyl group or an alkyl group having 1 to 8 carbon atoms, and $R^{18}$ represents a hydrogen atom, a hydroxyl group or an alkyl group having 1 to 8 carbon atoms. $R^{17}$ and $R^{18}$ may be the same or different.

[Formula 5]

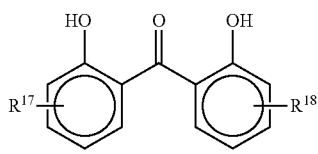

(5)

An excellent effect of the present invention of preventing the deterioration of the retardation element is exerted only when the interlayer film for a laminated glass contains both of the benzotriazole compound or the benzophenone compound, and at least one compound selected from the group consisting of the malonic ester compound, the oxanilide compound and the triazine compound respectively in a certain amount or more.

In the interlayer film for a laminated glass, a lower limit of the sum of the contents of the malonic ester compound, the oxanilide compound and the triazine compound with respect to 100 parts by weight of the thermoplastic resin is 0.8 parts by weight. When the content of at least one compound, which is selected from the group consisting of the malonic ester compound, the oxanilide compound and the triazine compound, is less than 0.8 parts by weight, the retardation element is deteriorated by exposure to light.

In the interlayer film for a laminated glass, a lower limit of the content of the benzotriazole compound and the benzophenone compound with respect to 100 parts by weight of the thermoplastic resin is 0.8 parts by weight. When the content of the benzotriazole compound and the benzophenone compound is less than 0.8 parts by weight, the retardation element is deteriorated by exposure to light.

Particularly, the interlayer film for a laminated glass contains, as the ultraviolet absorber, the benzotriazole compound or the benzophenone compound, and at least one compound selected from the group consisting of the malonic ester compound, the oxanilide compound and the triazine compound, and the content of the at least one compound selected from the group consisting of the malonic ester compound, the oxanilide compound and the triazine compound is preferably 0.8 parts by weight or more with respect to 100 parts by weight of the thermoplastic resin and the content of the benzotriazole compound or the benzophenone compound is preferably 0.8 parts by weight or more with respect to 100 parts by weight of the thermoplastic resin.

In the interlayer film for a laminated glass, the content of the at least one compound selected from the group consisting of the malonic ester compound, the oxanilide compound and the triazine compound is preferably 0.8 parts by weight or more with respect to 100 parts by weight of the thermoplastic resin.

Further, in the interlayer film for a laminated glass, the content of the benzotriazole compound or the benzophenone compound is preferably 0.8 parts by weight or more with respect to 100 parts by weight of the thermoplastic resin.

When the interlayer film for a laminated glass contains the triazine compound and the benzotriazole compound as the ultraviolet absorber, a preferred upper limit of the content of the triazine compound is 2.0 parts by weight and a preferred upper limit of the content of the benzotriazole compound is 1.4 parts by weight with respect to 100 parts by weight of the thermoplastic resin. When the content of the triazine compound is more than 2.0 parts by weight, the interlayer film for a laminated glass to be obtained may decrease in transparency and may increase in a haze value. When the content of the benzotriazole compound is more than 1.4 parts by weight, the benzotriazole compound may precipitate out of the interlayer film for a laminated glass to be obtained.

A preferred lower limit of the sum of the content of the triazine compound and the content of the benzotriazole compound is 1.7 parts by weight and a preferred upper limit thereof is 3.4 parts by weight with respect to 100 parts by weight of the thermoplastic resin since the content in this range has an excellent effect of preventing the retardation element from deteriorating due to exposure to light.

When the interlayer film for a laminated glass contains the oxanilide compound and the benzotriazole compound as the ultraviolet absorber, a preferred upper limit of the content of the oxanilide compound is 1.4 parts by weight and a preferred upper limit of the content of the benzotriazole compound is 1.4 parts by weight with respect to 100 parts by weight of the thermoplastic resin. When the content of the oxanilide compound is more than 1.4 parts by weight, the interlayer film for a laminated glass to be obtained may decrease in transparency and may increase in a haze value. When the content of the benzotriazole compound is more than 1.4 parts by weight, the benzotriazole compound may precipitate out of the interlayer film for a laminated glass to be obtained.

A preferred lower limit of the sum of the content of the oxanilide compound and the content of the benzotriazole compound is 1.7 parts by weight and a preferred upper limit thereof is 2.8 parts by weight with respect to 100 parts by weight of the thermoplastic resin since the content in this range has an excellent effect of preventing the retardation element from deteriorating due to exposure to light.

When the interlayer film for a laminated glass contains the malonic ester compound and the benzotriazole compound as the ultraviolet absorber, a preferred upper limit of the content of the malonic ester compound is 1.2 parts by weight and a preferred upper limit of the content of the benzotriazole compound is 1.4 parts by weight with respect to 100 parts by weight of the thermoplastic resin. When the content of the malonic ester compound is more than 1.2 parts by weight, the interlayer film for a laminated glass to be obtained may decrease in transparency and may increase in a haze value. When the content of the benzotriazole compound is more than 1.4 parts by weight, the benzotriazole compound may precipitate out of the interlayer film for a laminated glass to be obtained.

A preferred lower limit of the sum of the content of the malonic ester compound and the content of the benzotriazole compound is 1.7 parts by weight and a preferred upper limit thereof is 2.6 parts by weight with respect to 100 parts by weight of the thermoplastic resin since the content in this range has an excellent effect of preventing the retardation element from deteriorating due to exposure to light.

When the interlayer film for a laminated glass contains the triazine compound and the benzophenone compound as the ultraviolet absorber, a preferred upper limit of the content of the triazine compound is 2.0 parts by weight and a preferred upper limit of the content of the benzophenone compound is 1.6 parts by weight with respect to 100 parts by weight of the thermoplastic resin. When the content of the triazine compound is more than 2.0 parts by weight or the content of the benzophenone compound is more than 1.6 parts by weight, the interlayer film for a laminated glass to be obtained decreases in transparency and increases in a haze value.

When the interlayer film for a laminated glass contains the oxanilide compound and the benzophenone compound as the ultraviolet absorber, a preferred upper limit of the content of the oxanilide compound is 1.4 parts by weight and a preferred upper limit of the content of the benzophenone compound is 1.6 parts by weight with respect to 100 parts by weight of the thermoplastic resin. When the content of the oxanilide compound is more than 1.4 parts by weight or the content of the benzophenone compound is more than 1.6 parts by weight, the interlayer film for a laminated glass to be obtained decreases in transparency and increases in a haze value.

When the interlayer film for a laminated glass contains the malonic ester compound and the benzophenone compound as the ultraviolet absorber, a preferred upper limit of the content of the malonic ester compound is 1.2 parts by weight and a preferred upper limit of the content of the benzophenone compound is 1.6 parts by weight with respect to 100 parts by weight of the thermoplastic resin. When the content of the malonic ester compound is more than 1.2 parts by weight or the content of the benzophenone compound is more than 1.6 parts by weight, the interlayer film for a laminated glass to be obtained decreases in transparency and increases in a haze value.

It is preferred for the interlayer film for a laminated glass to contain the benzotriazole compound as the ultraviolet absorber. Examples of the form of inclusion of the benzotriazole compound include the combined use of the triazine compound and the benzotriazole compound, the combined use of the oxanilide compound and the benzotriazole compound, the combined use of the malonic ester compound and the benzotriazole compound, the combined use of the triazine compound, the malonic ester compound and the benzotriazole compound, the combined use of the triazine compound, the oxanilide compound and the benzotriazole compound, and the combined use of the malonic ester compound, the oxanilide compound and the benzotriazole compound.

Further, the interlayer film for a laminated glass preferably contains a hindered amine compound in combination with the ultraviolet absorber. By using the hindered amine compound in combination, it is possible to prevent more the retardation element from deteriorating due to exposure to light.

The hindered amine compound is not particularly limited. Examples thereof include LA-63P (produced by Adeka Corporation, high molecular weight HALS), TINUVIN 144 (produced by Ciba-Geigy Ltd., low molecular weight HALS), and the like.

The content of the hindered amine compound in the interlayer film for a laminated glass is not particularly limited, but a preferred lower limit is 0.03 parts by weight and a preferred upper limit is 0.4 parts by weight with respect to 100 parts by weight of the thermoplastic resin described later. When the content of the hindered amine compound is less than 0.03 parts by weight, the effect of including the hindered amine compound may not be achieved. When the content of the hindered amine compound is more than 0.4 parts by weight, the transparency of the interlayer film for a laminated glass may deteriorate and the haze value of the interlayer film for a laminated glass may increase. A more preferred lower limit of the content of the hindered amine compound is 0.04 parts by weight and a more preferred upper limit is 0.2 parts by weight, and a furthermore preferred lower limit is 0.05 parts by weight and a furthermore preferred upper limit is 0.15 parts by weight.

The interlayer film for a laminated glass contains a thermoplastic resin.

The thermoplastic resin is not particularly limited. Examples thereof include a polyvinyl acetal resin, an ethylene-vinyl acetate copolymer resin, an ethylene-acrylic copolymer resin, a polyurethane resin, a polyurethane resin containing a sulfur element, a polyvinyl alcohol resin, and the like. Among these resins, a polyvinyl acetal resin is suitably used since it gives an interlayer film for a laminated glass which exhibits excellent adhesion to glass when being used in conjunction with a plasticizer.

The polyvinyl acetal resin is not particularly limited as long as it is a polyvinyl acetal resin obtained by acetalizing polyvinyl alcohol with an aldehyde, but a polyvinyl butylal resin is suitable. Further, two or more kinds of polyvinyl acetal resins may be used in combination as required.

A preferred lower limit of the acetalization degree of the polyvinyl acetal resin is 40 mol % and a preferred upper limit thereof is 85 mol %, a more preferred lower limit is 55 mol % and a more preferred upper limit is 80 mol %, and a furthermore preferred lower limit is 60 mol % and a furthermore preferred upper limit is 75 mol %.

Further, a preferred lower limit of the butyralization degree of the polyvinyl butyral resin is 40 mol % and a preferred upper limit thereof is 85 mol %, a more preferred lower limit is 55 mol % and a more preferred upper limit is 80 mol %, and a furthermore preferred lower limit is 60 mol % and a furthermore preferred upper limit is 75 mol %.

Here, the acetalization degree and the butyralization degree can be measured by an infrared absorption (IR) spectroscopy. For example, the acetalization degree and the butyralization degree can be measured with FT-IR (manufactured by HORIBA, Ltd., FREEEXACT-II, FT-720).

When the polyvinyl butyral resin is used as the polyvinyl acetal resin, a preferred lower limit of the amount of hydroxyl groups is 15 mol % and a preferred upper limit thereof is 35 mol %.

When the amount of hydroxyl groups is less than 15 mol %, adhesion between the interlayer film for a laminated glass and the glass may deteriorate and penetration resistance of the laminated glass may deteriorate. When the amount of the hydroxyl group is more than 35 mol %, the interlayer film for a laminated glass may become hard.

The polyvinyl acetal resin can be prepared by acetalizing polyvinyl alcohol with an aldehyde.

The polyvinyl alcohol is usually obtained by saponifying polyvinyl acetate, and polyvinyl alcohol having a saponification degree of 80 to 99.8 mol % is generally used.

A preferred lower limit of the polymerization degree of the polyvinyl alcohol is 200 and a preferred upper limit thereof is 4000. When the polymerization degree is less than 200, the penetration resistance of the laminated glass may deteriorate. When the polymerization degree is more than 4000, forming of the interlayer film for a laminated glass may be difficult. A more preferred lower limit of the polymerization degree is 500 and a more preferred upper limit thereof is 3000, and a furthermore preferred lower limit is 1000 and a furthermore preferred upper limit is 2500.

The aldehyde is not particularly limited, but generally, an aldehyde having 1 to 10 carbon atoms is suitably employed. The aldehyde having 1 to 10 carbon atoms is not particularly limited, and examples thereof include n-butyl aldehyde, isobutyl aldehyde, n-valeraldehyde, 2-ethylbutyl aldehyde, n-hexyl aldehyde, n-octyl aldehyde, n-nonyl aldehyde, n-decyl aldehyde, formaldehyde, acetaldehyde, benzaldehyde, and the like. Among these aldehydes, as the above-mentioned aldehyde, n-butyl aldehyde, n-hexyl aldehyde and n-valeraldehyde are preferred, and n-butyl aldehyde is more preferred.

These aldehydes may be used singly, or may be used in combination of two or more species of them.

The interlayer film for a laminated glass preferably contains a plasticizer in addition to the above-mentioned constitution. Particularly, the interlayer film for a laminated glass preferably contains a polyvinyl acetal resin and a plasticizer.

The plasticizer is not particularly limited. Examples thereof include organic ester plasticizers such as a monobasic organic acid ester and a polybasic organic acid ester; phosphate plasticizers such as an organic phosphate plasticizer and an organic phosphite plasticizer; and the like. The plasticizer is preferably a liquid plasticizer.

The monobasic organic acid ester is not particularly limited. Examples thereof include glycol esters prepared by the reaction between a glycol such as triethylene glycol, tetraethylene glycol or tripropylene glycol and a monobasic organic acid such as butyric acid, isobutyric acid, caproic acid, 2-ethylbutyric acid, heptylic acid, n-octylic acid, 2-ethylhexylic acid, pelargonic acid (n-nonylic acid) or decylic acid, and the like. Among these, triethylene glycol-dialkyl acid esters such as triethylene glycol dicaproate, triethylene glycol di-2-ethylbutyrate, triethylene glycol di-n-octylate and triethylene glycol di-2-ethylhexylate are suitable.

The polybasic organic acid ester is not particularly limited. Examples thereof include ester compounds of a polybasic organic acid such as adipic acid, sebacic acid or azelaic acid, and an alcohol having 4 to 8 carbon atoms and a straight-chain structure or a branching structure. Among these ester compounds, dihexyl adipate, dibutyl sebacate, dioctyl azelate, and dibutyl carbitol adipate are suitable.

The organic ester plasticizer is not particularly limited. Examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-2-ethylhexanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol diheptanoate, tetraethylene glycol diheptanoate, dihexyl adipate, dioctyl adipate, hexyl cyclohexyl adipate, heptyl adipate and nonyl adipate, a mixture of diisonyl adipate, heptyl nonyl adipate, dibutyl sebacate, oil-modified sebacate alkyd, a mixture of phosphate and adipate, and the like.

The organic phosphate plasticizer is not particularly limited. Examples thereof include tributoxyethyl phosphate, isodecylphenyl phosphate, triisopropyl phosphate, and the like.

Among the above-mentioned plasticizers, at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3 GH), tetraethylene glycol di-2-ethylbutyrate (4 GH), tetraethylene glycol di-n-heptanoate (4G7) and triethylene glycol di-n-heptanoate (3G7) can prevent temporal change of the adhesive force between the interlayer film for a laminated glass and the glass when it contains a metal salt of carboxylic acid having 5 or 6 carbon atoms as an adhesive force control agent.

Furthermore, the plasticizer is preferably triethylene glycol di-2-ethylhexanoate (3GO), triethylene glycol di-2-ethylbutyrate (3 GH), tetraethylene glycol di-2-ethylhexanoate (4GO), or dihexyl adipate (DHA) and more preferably triethylene glycol di-2-ethylhexanoate (3GO) since these plasticizers hardly cause hydrolysis.

The content of the plasticizer in the interlayer film for a laminated glass is not particularly limited, but a preferred lower limit is 30 parts by weight and a preferred upper limit is 70 parts by weight with respect to 100 parts by weight of the thermoplastic resin. When the content of the plasticizer is less than 30 parts by weight, melt viscosity of the interlayer film for a laminated glass becomes high and a defoaming property during production of the laminated glass may deteriorate. When the content of the plasticizer is more than 70 parts by weight, the plasticizer may cause bleeding from the interlayer film for a laminated glass. A more preferred lower limit of the plasticizer content is 35 parts by weight and a more preferred upper limit thereof is 60 parts by weight, and a furthermore preferred lower limit is 38 parts by weight and a furthermore preferred upper limit is 50 parts by weight.

The interlayer film for a laminated glass may contain additives such as an anti-oxidant, a light stabilizer, a flame retarder, an antistatic agent, an adhesion adjuster, a moisture resistance agent, a blue pigment, a blue dye, a green pigment, a green dye, a fluorescent brightener, an infrared absorber and the like as required.

The thickness of the interlayer film for a laminated glass is not particularly limited, but a preferred lower limit thereof is 0.1 mm and a preferred upper limit thereof is 3 mm. When the thickness of the interlayer film for a laminated glass is less than 0.1 mm, the penetration resistance of the laminated glass may deteriorate. When the thickness of the interlayer film for a laminated glass is more than 3 mm, the interlayer film for a laminated glass may decrease in transparency and may increase in a haze value. More preferably, the lower limit of the thickness of the interlayer film for a laminated glass is 0.25 mm and the upper limit thereof is 1.5 mm, and furthermore preferably, the lower limit is 0.3 mm and the upper limit is 1.2 mm, and particularly preferably, the lower limit is 0.5 mm and the upper limit is 1.0 mm.

In the interlayer film for a laminated glass, it is preferred that the visible light transmittance Tv of the interlayer film having a thickness of 760 µm, which is measured by the method according to JIS R 3106 with the interlayer film supported by being sandwiched between two clear glasses of 2.5 mm in thickness, is 60% or more. When the visible light transmittance Tv is less than 60%, a laminated glass prepared by using the interlayer film for a laminated glass may decrease in transparency and may increase in a haze value. The visible light transmittance Tv is preferably 70% or more, more preferably 80% or more, and furthermore preferably 85% or more.

An apparatus for measuring the visible light transmittance Tv is not particularly limited, and examples thereof include a spectrophotometer ("U-4000" manufactured by Hitachi, Ltd.).

The method of producing the interlayer film for a laminated glass is not particularly limited, and examples thereof include a method of adding an ultraviolet absorber, a plasticizer, and additives to be mixed as required to the thermoplastic resin, kneading the resulting mixture, and forming the mixture into an interlayer film for a laminated glass.

The method of kneading is not particularly limited, and examples thereof include methods using an extruder, a plastograph, a kneader, a Banbury mixer, a calendering roll, and the like.

Further, the method of forming is not particularly limited, and examples thereof include an extrusion method, a calendaring method, a pressing method, and the like.

In the laminate for a laminated glass of the present invention, the retardation element is sandwiched between the adhesive layers. By sandwiching the retardation element between the adhesive layers, the impact resistance of the laminated glass is improved since the retardation element adheres tightly to the interlayer film for a laminated glass and the glass. Particularly, when the retardation element sandwiched between the adhesive layers adheres tightly to the interlayer film for a laminated glass and the glass on the vehicle interior side, the impact resistance of the laminated glass is further improved. Here, the retardation element sandwiched between the adhesive layers means that the adhesive layer, the retardation element and the adhesive layer are sequentially laminated.

The retardation element is not particularly limited and is preferably a retardation element containing a liquid crystalline compound. Examples thereof include retardation elements prepared by applying a liquid crystalline compound onto a transparent substrate made of a transparent plastic film, such as polyethylene terephthalate (PET), exerting a shear force on the resulting film, and heat-treating and cooling the film to fix the liquid crystal alignment.

Among these retardation elements, a retardation element containing a liquid crystalline compound and at least one compound selected from the group consisting of a compound represented by the following formula (6), a compound represented by the following formula (7) and a compound represented by the following formula (8) is suitable. Such a retardation element has excellent heat resistance, is small in the changes in the retardation value in an atmosphere of high temperatures, and can maintain stable optical performance.

[Formula 6]

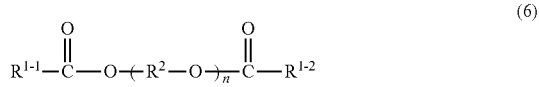
(6)

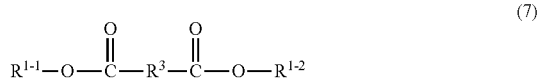
(7)

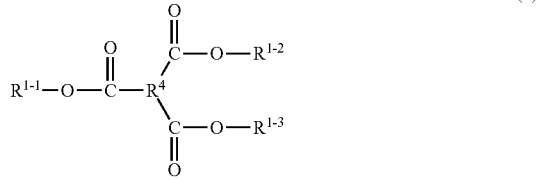
(8)

In the formula (6), n represents an integer of 3 to 10 and $R^2$ represents a —$CH_2$—$CH_2$— group, a —$CH_2$—$CH(CH_3)$— group or a —$CH_2$—$CH_2$—$CH_2$— group.

In the formula (7), $R^3$ represents a —$(CH_2)_p$— group or a phenylene group and p represents an integer of 4 to 8.

In the formula (8), $R^4$ represents a substituted phenylene group. In the formulas (6) to (8), $R^{1-1}$, $R^{1-2}$ and $R^{1-3}$ each represent an alkyl group having a branching structure having 5 or more carbon atoms, and $R^{1-1}$, $R^{1-2}$ and $R^{1-3}$ may be the same or different.

In the formulas (6) to (8), $R^{1-1}$, $R^{1-2}$ and $R^{1-3}$ each represent an alkyl group having a branching structure having 5 or more carbon atoms. When $R^{1-1}$, $R^{1-2}$ and $R^{1-3}$ are each an alkyl group having a branching structure, changes in the retardation value in an atmosphere of high temperatures are particularly small. Preferably, the lower limit of the number of the carbon atoms is 6 and the upper limit thereof is 18. Among these, $R^{1-1}$, $R^{1-2}$ and $R^{1-3}$ are preferably each a $CH_3$—$(CH_2)_m$—CH($C_2H_5$)— group, and more preferably a 2-ethylhexyl group or a 2-ethylbutyl group. Here, m represents an integer of 1 to 6.

When $R^3$ is a phenylene group in the formula (7), $R^3$ may have a substituent at any of an ortho position, a meta position and a para position, but it preferably has a substituent at an ortho position.

When $R^4$ is a substituted phenylene group in the formula (8), $R^4$ may have a substituent at any of an ortho position, a meta position and a para position, but it preferably has a substituent at an ortho position and a para position.

In the formula (6), $R^2$ represents a —$CH_2$—$CH_2$— group, a —$CH_2$—$CH(CH_3)$— group or a —$CH_2$—$CH_2$—$CH_2$— group. Among these groups, a —$CH_2$—$CH_2$— group is suitable.

Examples of the compound represented by the formula (6) include triethylene glycol di-2-ethylhexanoate (3GO), tetraethylene glycol di-2-ethylhexanoate (4GO), triethylene glycol di-2-ethylbutyrate (3 GH), tetraethylene glycol di-2-ethylbutyrate, pentaethylene glycol di-2-ethylhexanoate, octaethylene glycol di-2-ethylhexanoate, nonaethylene glycol di-2-ethylhexanoate, decaethylene glycol di-2-ethylhexanoate, and the like.

Examples of the compound represented by the formula (7) include bis(2-ethylhexyl)adipate, bis(2-ethylbutyl)adipate, bis(2-ethylhexyl)azelate, bis(2-ethylbutyl)azelate, di-2-ethylhexyl sebacate, di-2-ethylbutyl sebacate, di-2-ethylhexyl phthalate, di-2-ethylbutyl phthalate, and the like.

Examples of the compound represented by the formula (8) include tri-2-ethylhexyl trimellitate, tri-2-ethylbutyl trimellitate, and the like.

The compound represented by the formula (6), the compound represented by the formula (7), and the compound represented by the formula (8) may be used alone or may be used in combination of two or more species of them. Among them, the compound represented by the formula (6) is preferred since it is superior in compatibility with the liquid crystalline compound and makes it possible to attain a stable retardation element. Among the compounds represented by the formula (6), triethylene glycol di-2-ethylhexanoate (3GO), tetraethylene glycol di-2-ethylhexanoate (4GO), and triethylene glycol di-2-ethylbutyrate (3 GH) are more preferred, and triethylene glycol di-2-ethylhexanoate (3GO) is furthermore preferred since they are excellent in the compatibility with the liquid crystalline compound and particularly excellent in an effect of suppressing the changes in the retardation value in an atmosphere of high temperatures.

The content of at least one compound selected from the group consisting of the compound represented by the formula (6), the compound represented by the formula (7) and the compound represented by the formula (8) is not particularly limited, but a preferred lower limit of the content is 0.1 parts by weight and a preferred upper limit thereof is 300 parts by weight with respect to 100 parts by weight of the liquid crystalline compound. When the content of the above-mentioned compound is less than 0.1 parts by weight, the effect of suppressing the changes in the retardation value in an atmosphere of high temperatures may not be achieved. Even when the content of the compound is more than 300 parts by weight, the effect of suppressing the changes in the retardation value in an atmosphere of high temperatures of the present invention does not vary. More preferably, the lower limit of the content of the compound is 0.5 parts by weight and the upper limit thereof is 50 parts by weight, and furthermore preferably, the lower limit is 0.8 parts by weight and the upper limit is 30 parts by weight, and particularly preferably, the lower limit is 1 part by weight and the upper limit is 15 parts by weight.

The liquid crystalline compound is not particularly limited as long as it is a compound which exhibits liquid crystallinity in aligning in a specific direction (for example, horizontal alignment, vertical alignment, splay alignment, twisted alignment, tilted alignment, or the like). Examples of the liquid crystalline compound include main chain type liquid crystal polymers such as polyester, polyamide and polyesterimide; side chain type liquid crystal polymers such as polyacrylate, polymethacrylate, polymalonate and polyether; a polymerizable liquid crystal; and the like. The polymerizable liquid crystal refers to a liquid crystalline compound having a polymerizable group in its molecule. Particularly, the liquid crystalline compound is preferably a polymerizable liquid crystal because the state of alignment can be fixed by polymerization.

The polymerizable group is not particularly limited, and examples thereof include reactive groups such as a (meth) acryloyl group, a vinyl group, a chalconyl group, a cinnamoyl group, an epoxy group, and the like. The polymerizable liquid crystal commonly exhibits liquid crystallinity in a pre-polymerized state and is aligned in a specific direction and then is polymerized to fix the alignment state. After the fixation of the alignment state, the polymerizable liquid crystal does not necessarily have to exhibit liquid crystallinity. Such a compound in which the alignment state is fixed by the polymerization is also included in the liquid crystalline compound in the present invention. If a compound obtained by polymerizing the polymerizable liquid crystal singly or by polymerizing a plurality of the polymerizable liquid crystals, or a compound obtained by copolymerizing the polymerizable liquid crystal with another polymerizable compound exhibits liquid crystallinity in aligning, this compound is included in the liquid crystalline compound of the present invention even if the polymerizable liquid crystal before polymerization or the compound after polymerization does not exhibit liquid crystallinity.

The polymerizable liquid crystal preferably has a mesogenic group in its molecule in order to exhibit liquid crystallinity.

Here, examples of the mesogenic group include rod-like substituents such as a biphenyl group, a terphenyl group, a group of phenyl ester of (poly)benzoic acid, a (poly)ether group, a benzylideneaniline group, an acenaphthoquinoxaline group and the like; plate-like substituents; disc-like substituents such as a triphenylene group, a phthalocyanine group, an aza-crown group and the like; and the like. That is, the mesogenic group has a capability of deriving a behavior of a liquid crystal phase. In addition, a liquid crystalline compound having a rod-like or plate-like substituent is known as a calamitic liquid crystal. Further, a liquid crystalline compound having a disk-like substituent is known as a discotic liquid crystal.

The polymerizable liquid crystal having a mesogenic group does not necessarily have to exhibit a liquid crystal phase and may be a polymerizable liquid crystal which exhibits a liquid crystal phase by mixing with another compound, or by mixing with another compound having a mesogenic group, or by mixing with another liquid crystalline compound, or by polymerization of these mixtures.

The polymerizable liquid crystal is not particularly limited, and examples thereof include polymerizable liquid crystals described in Japanese Kokai Publication Hei-8-50206 (JP-A H08-50206), Japanese Kokai Publication 2003-315556 (JP-A 2003-315556), and Japanese Kokai Publication 2004-29824 (JP-A 2004-29824), "PALIOCOLOR series" produced by BASF, "RMM series" produced by Merck Ltd., and the like. Among these, a polymerizable liquid crystal represented by the following formula (9) is more preferred since it has excellent heat resistance by having a plurality of polymerizable groups.

[Formula 7]

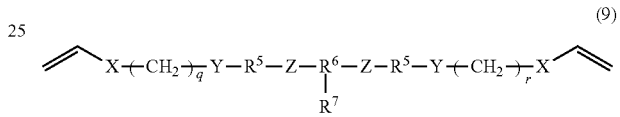

(9)

In the formula (9), q and r each represent an integer of 1 to 10, X represents —COO— or —O—, Y represents —OC(O)O— or —O—, Z represents —COO or —OCO—, $R^5$ represents a phenylene group, $R^6$ represents a substituted phenylene group, a substituted biphenylene group or a fluorenyl group, $R^7$ represents —H, —$(CH_2)_w$—$CH_3$ or —COO—$(CH_2)_w$—$CH_3$, and w represents an integer of 0 to 11.

Furthermore preferably, the polymerizable liquid crystal represented by the formula (9) is more specifically a polymerizable liquid crystal represented by the following formula (9-1) or a polymerizable liquid crystal represented by the following formula (9-2). These polymerizable liquid crystals may be used alone or may be used in combination of two or more species of them.

[Formula 8]

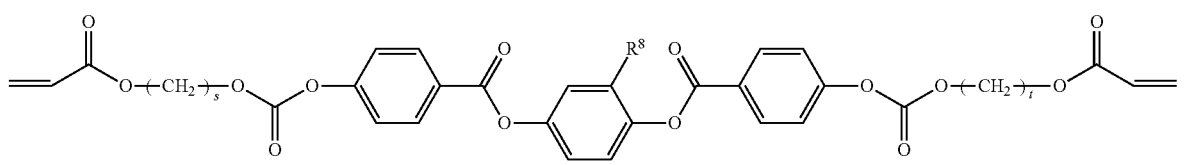

(9-1)

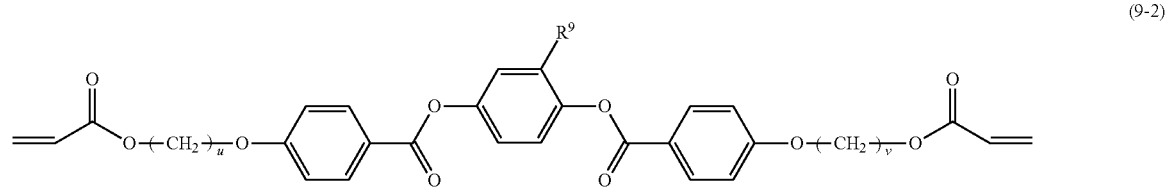

(9-2)

In the formula (9-1), s and t each represent an integer of 2 to 10, and $R^8$ represents —$(CH_2)_w$—$CH_3$.

In the formula (9-2), u and v each represent an integer of 2 to 10, and $R^9$ represents —COO—$(CH_2)_w$—$CH_3$ or —$(CH_2)_w$—$CH_3$.

W represents an integer of 0 to 11.

When the polymerizable liquid crystal represented by the formula (9) is used as the polymerizable liquid crystal, the polymerizable liquid crystal represented by the formula (9) may be used in conjunction with polymerizable liquid crystals represented by the following formulas (10) to (12) in order to adjust a phase transition temperature or mechanical strength of the retardation element.

[Formula 9]

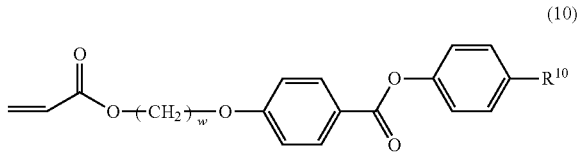

(10)

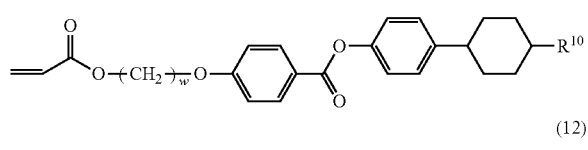

(11)

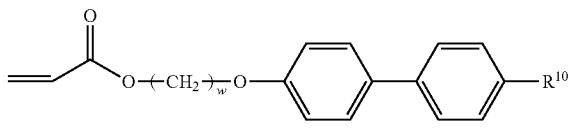

(12)

In the formulas (10) to (12), w represents an integer of 0 to 11, $R^{10}$ represents —O—$(CH_2)_y$—$CH_3$, —$(CH_2)_y$—$CH_3$ or —CN, and y represents an integer of 0 to 12.

The liquid crystalline compound may further contain the polymerizable liquid crystal and a polymerizable compound not having liquid crystallinity as polymerizing components. That is, the liquid crystalline compound may be synthesized by polymerizing a liquid crystalline composition containing the polymerizable liquid crystal and the polymerizable compound. In addition, the liquid crystalline composition may contain the compound represented by the formula (6), the compound represented by the formula (7) and the compound represented by the formula (8).

The polymerizable compound not having liquid crystallinity is not particularly limited, and examples thereof include an ultraviolet curable resin.

The ultraviolet curable resin is not particularly limited, and examples thereof include dipentaerythritol hexa(meth)acrylate, a reaction product of dipentaerythritol penta(meth)acrylate and 1,6-hexamethylene diisocyanate, a reaction product of triisocyanate having an isocyanuric ring and pentaerythritol tri(meth)acrylate, a reaction product of pentaerythritol tri(meth)acrylate and isophorone diisocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris(acryloxyethyl)isocyanurate, tris(methacryloxyethyl)isocyanurate, a reaction product of glycerol triglycidyl ether and (meth) acrylic acid, caprolactone-modified tris(acryloxyethyl)isocyanurate, a reaction product of trimethylolpropane triglycidyl ether and (meth)acrylic acid, triglycerol di(meth)acrylate, a reaction product of propylene glycol diglycidyl ether and (meth)acrylic acid, poly(propylene glycol) di(meth)acrylate, tripropylene glycol di(meth)acrylate, poly (ethylene glycol) di(meth)acrylate, tetraethylene glycol di(meth)acrylate, triethylene glycol di(meth)acrylate, pentaerythritol di(meth)acrylate, a reaction product of 1,6-hexanediol diglycidyl ether and (meth)acrylic acid, 1,6-hexanediol di(meth)acrylate, glycerol di(meth)acrylate, a reaction product of ethylene glycol diglycidyl ether and (meth)acrylic acid, a reaction product of diethylene glycol diglycidyl ether and (meth)acrylic acid, bis(acryloxyethyl) hydroxyethyl isocyanurate, bis(methacryloxyethyl)hydroxyethyl isocyanurate, a reaction product of bisphenol A diglycidyl ether and (meth)acrylic acid, tetrahydrofurfuryl (meth) acrylate, caprolactone-modified tetrahydrofurfuryl (meth) acrylate, 2-hydroxyethyl (meth)acrylate, 2-hydroxypropyl (meth)acrylate, poly(propylene glycol) (meth)acrylate, poly (ethylene glycol) (meth)acrylate, phenoxyhydroxypropyl (meth)acrylate, acryloyl morpholine, methoxy polyethylene glycol (meth)acrylate, methoxy tetraethylene glycol (meth) acrylate, methoxy triethylene glycol (meth)acrylate, methoxy ethylene glycol (meth)acrylate, methoxyethyl (meth) acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, butanediol mono(meth)acrylate, and the like. These polymerizable compounds not having liquid crystallinity may be used alone or in combination of two or more species of them.

The content of the polymerizable compound not having liquid crystallinity in the liquid crystalline composition is not particularly limited, but the polymerizable compound not having liquid crystallinity has to be added to such an extent that the liquid crystallinity of the liquid crystalline composition is not lost, and a preferred lower limit of the content is 0.1% by weight and a preferred upper limit is 20% by weight, and a more preferred lower limit is 1.0% by weight and a more preferred upper limit is 10% by weight.

When the liquid crystalline compound is a polymerizable liquid crystal of an ultraviolet curable type, or when the polymerizable compound not having liquid crystallinity is ultraviolet-curable, it is preferred to add a photopolymerization initiator to the liquid crystalline composition in order to harden these components with ultraviolet light.

The photopolymerization initiator is not particularly limited, and examples thereof include acetophenone compounds such as 2-methyl-1-[4-(methylthio)phenyl]-2-morpholinopropane-1-on ("IRGACURE 907" produced by Ciba Specialty Chemicals, Inc.), 2-benzyl-2-dimethylamino-1-(4-morpholinophenyl)-butanone-1 ("IRGACURE 369" produced by Ciba Specialty Chemicals, Inc.), 1-hydroxycyclohexyl phenyl ketone ("IRGACURE 184" produced by Ciba Specialty Chemicals, Inc.), 4-(2-hydroxyethoxy)phenyl-(2-hydroxy-2-propyl)ketone ("IRGACURE 2959" produced by Ciba Specialty Chemicals, Inc.), 1-(4-dodecylphenyl)-2-hydroxy-2-methylpropane-1-on ("DAROCUR 953" produced by Merck Ltd.), 1-(4-isopropylphenyl)-2-hydroxy-2-methylpropane-1-on ("DAROCUR 1116" produced by Merck Ltd.), 2-hydroxy-2-methyl-1-phenylpropane-1-on ("IRGACURE 1173" produced by Ciba Specialty Chemicals, Inc.), diethoxyacetophenone, and the like; benzoin compounds such as benzoin, benzoin methyl ether, benzoin ethyl ether, benzoin isopropyl ether, benzoin isobutyl ether, 2,2-dimethoxy-2-phenylacetophenone ("IRGACURE 651" produced by Ciba Specialty Chemicals, Inc.), and the like; thioxanthone compounds such as thioxanthone, 2-cloro-thioxanthone ("KAYACURE CTX" produced by Nippon Kayaku Co., Ltd.), 2-methyl thioxanthone, 2,4-dimethyl thioxanthone ("KAYACURE RTX" produced by Nippon Kayaku Co., Ltd.), isopropylthioxanthone, 2,4-dichloro thioxanthone ("KAYACURE CTX" produced by Nippon Kayaku Co., Ltd.), 2,4-diethyl thioxanthone ("KAYACURE DETX" produced by Nippon Kayaku Co., Ltd.), 2,4-diisopropyl thioxanthone ("KAYACURE DITX" produced by Nippon Kayaku Co., Ltd.), and the like; and the like. These photopolymerization initiators may be used alone or in combination of two or more species of them.

The content of the photopolymerization initiator in the liquid crystalline composition is not particularly limited, but a preferred lower limit of the content is 0.5 parts by weight and a preferred upper limit is 10 parts by weight and a more preferred lower limit is 2 parts by weight and a more preferred upper limit is 8 parts by weight with respect to 100 parts by weight of the sum of the polymerizable liquid crystal of an ultraviolet curable type and the ultraviolet-curable polymerizable compound not having liquid crystallinity.

When the thioxanthone compound is used as the photopolymerization initiator, it is preferred to use a reaction aid with the photopolymerization initiator in order to promote a photopolymerization reaction.

The reaction aid is not particularly limited, and examples thereof include amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, isoamyl 4-dimethylaminobenzoate, and the like.

The content of the reaction aid in the liquid crystalline composition is not particularly limited, but the reaction aid is preferably used to the extent that the liquid crystallinity of the liquid crystalline composition is not affected, and a preferred lower limit of the content is 0.5 parts by weight and a preferred upper limit is 10 parts by weight, and a more preferred lower limit is 2 parts by weight and a more preferred upper limit is 8 parts by weight with respect to 100 parts by weight of the sum of the polymerizable liquid crystal of an ultraviolet curable type and the ultraviolet-curable polymerizable compound not having liquid crystallinity.

Further, the content of the reaction aid is preferably 0.5 to 2 times the content of the photopolymerization initiator.

The retardation element can be produced, for example, by the step of preparing a liquid crystalline composition containing the liquid crystalline compound, and at least one compound selected from the group consisting of the compound represented by the formula (6), the compound represented by the formula (7) and the compound represented by the formula (8), and by the step of aligning the liquid crystalline composition in a certain direction by an alignment treatment, and by the step of fixing the resulting alignment.

More specifically, for example, the liquid crystalline composition is dissolved in a solvent so as to reach a predetermined concentration and the resulting solution is applied onto a film subjected to a rubbing treatment. Next, the solvent is removed by heating or the like. The liquid crystalline compound is aligned in a certain direction in this heating process or by being left standing at a temperature at which the liquid crystalline compound exhibits a liquid crystal phase after heating. In order to fix the alignment, the liquid crystalline compound may be cooled as it is, or may be hardened through polymerization or the like by irradiating the liquid crystalline compound with ultraviolet light while maintaining the aligned state. The retardation element may be produced by swelling the film, which is obtained by polymerization of the polymerizable liquid crystal, with at least one compound selected from the group consisting of the compound represented by the formula (6), the compound represented by the formula (7) and the compound represented by the formula (8).

Examples of the method of the alignment treatment include a method in which a plastic film such as a polyester film or a cellulose film is subjected to a rubbing treatment, a method in which an alignment film is formed on a glass plate or a plastic film and the alignment film is subjected to a rubbing treatment or an optical alignment treatment, and the like.

The rubbing treatment is achieved by using a rubbing roll produced by bonding a velvet-like rubbing cloth made of nylon, rayon, cotton or the like to a metal roll made of steel, aluminum or the like with a double-faced tape or the like, and rotating the rubbing roll at a high speed to move while being brought into contact with the glass plate or the plastic film.

The conditions of the rubbing treatment may be appropriately adjusted depending on various conditions such as ease of alignment of the liquid crystalline compound to be used, species of the rubbing cloth to be used, the rubbing roll diameter, the number of revolutions of the rubbing roll, the direction of revolution relative to the feeding direction of the substrate, the length of contact between the substrate and the rubbing roll, the strength of pressing the rubbing roll against the substrate, the carrying speed of the substrate, (hereinafter, for the case where the substrate is a plastic film) the wrap angle of a contact portion between the film and the rubbing roll, and the carrying tension of the plastic film.

Examples of the method of fixing the alignment include a method in which an ultraviolet-curable (liquid crystalline) compound is hardened through polymerization reaction by irradiation with ultraviolet light in the presence of a photopolymerization initiator to fix the alignment, a method in which a liquid crystalline composition containing a (liquid crystalline) compound having a functional group such as a hydroxyl group, a carboxyl group, an amino group or the like is cross-linked by heating in the presence of a cross-linking agent such as a polyhydric isocyanate compound or a polyhydric epoxy compound, which can react with the functional group by crosslinking, to fix the alignment, and a method in which a liquid crystalline compound exhibiting a liquid crystal phase in a region of high temperatures is employed, and the liquid crystalline compound is aligned in a high temperature atmosphere and then rapidly cooled to fix the alignment state.

Examples of the method of applying the liquid crystalline composition include a spin coating method, a wire-bar coating method, a gravure coating method, a calender coating method, a spray coating method, a meniscus coating method, a slot-die coating method and the like, and these methods are appropriately selected in order to attain a desired thickness and a desired retardation value.

Although the dose of the ultraviolet irradiation varies depending on the kind and the reactivity of the liquid crystalline compound and the other polymerizable compounds, the kind and the amount of the photopolymerization initiator to be added, and the film thickness, the dose may be generally about 100 to 1000 $mJ/cm^2$. In addition, as the atmosphere during ultraviolet irradiation, an appropriate atmosphere, for example, air, an inert gas such as nitrogen, or the like can be selected depending on ease of polymerization.

The retardation element has excellent heat resistance, is small in the changes in the retardation value in an atmosphere of high temperatures, and can maintain stable optical performance.

When the refractive index in a direction of maximum refractive index (slow axis direction) in one plane of the retardation element is denoted by $n_x$, the refractive index in a direction perpendicular in one plane to the slow axis direction is denoted by $n_y$, the refractive index in a thickness direction is denoted by $n_z$, and the thickness is denoted by d, the retardation value in a front direction $R_e$ and the retardation value in a thickness direction $R_{th}$ can be respectively determined by the following equations (13) and (14):

$$R_e = (n_x - n_y) \times d \quad (13), \text{ and}$$

$$R_{th} = [\{(n_x + n_y)/2\} - n_z] \times d \quad (14).$$

The values of $n_x$, $n_y$, and $n_z$ can be controlled by the species of the liquid crystalline composition to be used or the method of alignment. Examples of such a method include methods in which a surface tension of a substrate to be aligned, rubbing intensity, species of an alignment film, and the like are adjusted.

The adhesive layers, between which the retardation element is sandwiched, contain an adhesive having a glass transition temperature of −20° C. or lower (hereinafter, also simply referred to as an adhesive). If the glass transition temperature of the adhesive is more than −20° C., it is difficult to obtain a laminate for a laminated glass having sufficient impact resistance. The adhesive layers, between which the retardation element is sandwiched, preferably contain an adhesive having a glass transition temperature of −20 to −70° C. In addition, as described later, by adjusting the composition of monomer components in preparing a polymer to be a main component of the adhesive by copolymerization, it is possible to obtain an adhesive having a desired glass transition temperature.

The adhesive having a glass transition temperature of −20° C. or lower is not particularly limited and examples thereof include pressure sensitive adhesives such as an acrylic adhesive, a silicone adhesive, a urethane adhesive, a polyether adhesive, a polyester adhesive, a rubber adhesive and the like. Among these adhesives, the acrylic adhesive is particularly preferred since it has excellent impact resistance.

In addition, the glass transition temperature can be measured by use of a viscoelasticity measuring apparatus (manufactured by TA Instruments Co., Ltd., ARES). The glass transition temperature is measured, for example, under the conditions of a measured temperature range of −100 to 180° C., a temperature scanning rate of 5° C./min, a parallel plate of 25 mmϕ, a strain amount of 10% and an angular velocity of 1 rad/sec.

Examples of the acrylic adhesive include an acrylic adhesive containing a polymer, which is obtained by copolymerizing a plurality of (meth)acrylic esters as a main component of monomer components. Examples of the monomer components of the polymer include alkyl esters of (meth)acrylic acid, in which an ester portion has 1 to 14 carbon atoms, such as ethyl (meth)acrylate, butyl (meth)acrylate, pentyl (meth)acrylate, hexyl (meth)acrylate, heptyl (meth)acrylate, isoamyl (meth)acrylate, 2-ethylhexyl (meth)acrylate, isooctyl (meth)acrylate, isononyl (meth)acrylate, isomyristyl (meth)acrylate, and the like; benzyl (meth)acrylate, naphthyl (meth)acrylate, phenoxyethyl (meth)acrylate, phenoxybutyl (meth)acrylate, 2-hydroxyethyl (meth)acrylate, 4-hydroxyethyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyrauryl (meth)acrylate, (4-hydroxymethylcyclohexyl)-methylacrylate, 2-methyl-3-hydroxypropyl (meth)acrylate, acrylic acid, methacrylic acid, itaconic acid, maleic acid, glycidyl (meth)acrylate, methyl glycidyl (meth)acrylate, 3,4-epoxy-cyclohexyl methyl (meth)acrylate, methyl (meth)acrylate, methoxyethyl (meth)acrylate, ethoxymethyl (meth)acrylate, and the like.

Further, as the monomer components of the polymer other than the (meth)acrylic ester, copolymerizable monomers, such as dimethylaminomethylacrylamide, N,N-dimethylacrylamide, acryloyl morpholine, a vinyl ether monomer, vinyl acetate, (meth)acrylamide, (meth)acrylonitrile, and the like, can be used.

By copolymerizing the above-mentioned monomer components, a polymer which is a main component of the acrylic adhesive can be prepared. Among these monomers, it is preferred to use a polymer obtained by copolymerizing at least one monomer of alkyl esters of (meth)acrylic acid, in which an ester portion has 1 to 14 carbon atoms, such as ethyl (meth)acrylate, butyl (meth)acrylate, pentyl (meth)acrylate, hexyl (meth)acrylate, heptyl (meth)acrylate, isoamyl (meth) acrylate, 2-ethylhexyl (meth)acrylate, isooctyl (meth)acrylate, isononyl (meth)acrylate and isomyristyl (meth)acrylate with at least one monomer of methyl (meth)acrylate, 2-hydroxyethyl (meth)acrylate, 4-hydroxyethyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyrauryl (meth)acrylate, (4-hydroxymethylcyclohexyl)-methylacrylate, 2-methyl-3-hydroxypropyl (meth)acrylate, N,N-dimethylacrylamide, acrylic acid, methacrylic acid, itaconic acid, and maleic acid.

When the acrylic adhesive contains the polymer obtained by copolymerizing (meth)acrylic acid as a monomer component, the content of the (meth)acrylic acid is preferably 0.1 parts by weight or more and more preferably 1.0 part by weight or more with respect to 100 parts by weight of the whole monomer components. When the content of the (meth) acrylic acid is within the above range, the deterioration of the retardation element in heating the laminate for a laminated glass to be obtained can be suppressed.

As the acrylic adhesive, particularly, the following five types (adhesive 1 to adhesive 5) are suitable.

The adhesive 1 is obtained by copolymerizing butyl acrylate, methyl acrylate, methyl methacrylate and acrylic acid as monomer components.

The adhesive 2 is obtained by copolymerizing butyl acrylate, methyl acrylate, N,N-dimethylacrylamide and 2-hydroxyethylacrylate as monomer components.

The adhesive 3 is obtained by copolymerizing 2-ethylhexyl acrylate and 2-hydroxyethylacrylate as monomer components.

The adhesive 4 is obtained by copolymerizing butyl acrylate, acrylic acid and 2-hydroxyethylmethacrylate as monomer components.

The adhesive 5 is obtained by copolymerizing butyl acrylate and acrylic acid as monomer components.

Particularly, in the laminate for a laminated glass of the present invention, when an adhesive composing the adhesive layer in contact with the interlayer film for a laminated glass is denoted by an adhesive A and an adhesive composing the adhesive layer in contact with the glass is denoted by an adhesive B, (adhesive A, adhesive B) is preferably (adhesive 1, adhesive 2), (adhesive 1, adhesive 4), (adhesive 2, adhesive 2), (adhesive 1, adhesive 3), (adhesive 4, adhesive 4), or (adhesive 5, adhesive 5). Particularly when (adhesive A, adhesive B) is (adhesive 1, adhesive 2), (adhesive 1, adhesive 4), or (adhesive 5, adhesive 5), not only a change in a retardation value of the laminate for a laminated glass is small even in an atmosphere of high temperatures and stable optical performance can be maintained, but also the laminated glass in which the laminate for a laminated glass is used is excellent in the impact resistance. Particularly, the adhesive A preferably contains a polymer prepared by copolymerizing (meth) acrylic acid since, in such a case, the laminated glass in which the laminate for a laminated glass is used is excellent in the impact resistance.

The adhesive may contain a cross-linking agent in order to adjust durability of the adhesive or adherence to the retardation element or glass. The cross-linking agent is not particularly limited, and examples thereof include a cross-linking agent which reacts with a hydroxyl group or a carboxyl group and forms cross-linking when a monomer containing a hydroxyl group or a carboxyl group is used as a monomer component to constitute the adhesive. Examples of the cross-linking agent include an isocyanate compound, an epoxy compound, a metal chelate compound, a melamine compound, an aziridine compound, metal salt, and the like.

The isocyanate compound is not particularly limited, and examples thereof include toluene diisocyanate, hydrogenated toluene diisocyanate, toluene diisocyanate adduct of trimethylolpropane, xylylene diisocyanate of trimethylolpropane, triphenylmethane triisocyanate, methylene bis(4-phenylmethane)triisocyanate, isophorone diisocyanate, hexamethylene diisocyanate, ketoxime-blocked products and phenol-blocked products thereof, and the like. Further, examples of the isocyanate compound include polyisocyanate compounds in which an isocyanurate ring, a biuret product, an allophanate product or the like is formed, and the like.

The epoxy compound is not particularly limited, and examples thereof include bisphenol A, epichlorohydrin type epoxy resins, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, and the like.

The metal chelate compound is not particularly limited, and examples thereof include acetylacetone or acetoacetic ester coordination compounds of polyvalent metals such as aluminum, iron, copper, zinc, tin, titanium, nickel, magnesium, and the like.

The cross-linking agent may be used singly or may be used in combination of two or more species of them, and it is preferred to use isophorone diisocyanate, hexamethylene diisocyanate, and ketoxime-blocked products and phenol-blocked products thereof, and epoxy compounds in order to reduce the discoloration in an environment of high temperatures. The amount of the cross-linking agent is preferably in the range of 0.001 to 10 parts by weight and more preferably in the range of 0.01 to 5 parts by weight with respect to 100 parts by weight of the above-mentioned monomer component.

Further, the same adhesive layer may be employed for an adhesive layer on the side of the interlayer film for a laminated glass (adhesive layer 3 in FIG. 1) and for an adhesive layer on the side of the glass on the vehicle interior side (adhesive layer 5 in FIG. 1), or different adhesive layers may be employed in order to make the adhesion between the interlayer film for a laminated glass and the retardation element and the adhesion between the retardation element and the glass on the vehicle interior side substantially the same.

The interlayer film for a laminated glass, described above, used for the laminate for a laminated glass of the present invention, also constitutes the present invention. That is, an interlayer film for a laminated glass containing a thermoplastic resin and an ultraviolet absorber, wherein the interlayer film contains, as the ultraviolet absorber, a benzotriazole compound or a benzophenone compound, and at least one compound selected from the group consisting of a malonic ester compound, an oxanilide compound and a triazine compound, and the sum of the contents of the malonic ester compound, the oxanilide compound and the triazine compound is 0.8 parts by weight or more and the sum of the contents of the benzotriazole compound or the benzophenone compound is 0.8 parts by weight or more with respect to 100 parts by weight of the thermoplastic resin, also constitutes the present invention.

Uses of the interlayer film for a laminated glass of the present invention are not particularly limited, and by using the interlayer film for a laminated glass of the present invention and glass, a laminated glass can be produced. Such a laminated glass has the glass on the vehicle exterior side and the glass on the vehicle interior side as shown in FIG. 1. Further, as shown in FIG. 1, by sandwiching the retardation element between the adhesive layers and disposing the retardation element on the side of the glass on the vehicle interior side of the interlayer film for a laminated glass, the impact resistance of the laminated glass to be obtained can be improved and the deterioration of the retardation element can be prevented.

The glass on the vehicle exterior side and the glass on the vehicle interior side are not particularly limited and conventionally known clear sheet glasses can be employed.

Moreover, a transparent plastic plate such as a polycarbonate plate, a polymethyl methacrylate plate or the like may be employed in place of a glass plate.

The method of producing the laminated glass is not particularly limited and conventionally known methods can be used.

Effects of the Invention

According to the present invention, it is possible to provide a laminate for a laminated glass which is used as a head-up display (HUD) and is not deteriorated even if exposed to light, and with which a laminated glass having excellent impact resistance can be prepared. Further, according to the present invention, it is possible to provide an interlayer film for a laminated glass to be used in the laminate for a laminated glass.

BRIEF DESCRIPTION OF THE DRAWINGS

FIG. 1 is a diagram schematically showing a constitution of a laminated glass which can be prepared by using the laminate for a laminated glass of the present invention.

MODE FOR CARRYING OUT THE INVENTION

Hereinafter, aspects of the present invention will be described in more detail by way of examples, but the present invention is not limited to these examples.

EXAMPLE 1

(1) Preparation of Interlayer Film for Laminated Glass

A solution formed by dissolving 0.8 parts by weight of a benzotriazole compound (TINUVIN 326 produced by Ciba-Geigy Ltd.), 0.8 parts by weight of a triazine compound (TINUVIN 400 produced by Ciba-Geigy Ltd.) and 0.1 parts by weight of a hindered amine compound (TINUVIN 144 produced by Ciba-Geigy Ltd.) as ultraviolet absorbers in 40 parts by weight of triethylene glycol di-2-ethylhexanoate (3GO) as a plasticizer was added to 100 parts by weight of a polyvinyl butyral resin (amount of hydroxyl groups 30.5 mol %, amount of acetyl groups 0.9 mol %, average polymerization degree 1700), and the resulting mixture was uniformly melt-kneaded with a mixing roll, and then press formed at 150° C. for 30 minutes with a press forming machine to prepare an interlayer film for a laminated glass having a thickness of 0.76 mm.

(2) Preparation of Retardation Element 100 parts by weight of a polymerizable liquid crystal of an ultraviolet curable type (PARIOCOLOR LC242 produced by BASF, a polymerizable liquid crystal in which s is 4 and t is 4 in the formula (9-1)), 4 parts by weight of 2,4,6-trimethyl-benzoyldiphenylphosphineoxide (LUCIRIN TPO produced by BASF), and 0.1 parts by weight of a leveling agent (BYK-361 produced by BYK) were dissolved in 243 parts by weight of cyclopentanone to prepare a solution whose solid content was 30% by weight. Next, 10 parts by weight of triethylene glycol di-2-ethylhexanoate (3GO) was added and the resulting mixture was stirred until the mixture became homogeneous to prepare a solution of a liquid crystalline composition. Next, a polyester film (A4100 produced by TOYOBO Co., Ltd.) was subjected to a rubbing treatment using a rubbing machine (manufactured by EHC Co., Ltd., rubbing roll diameter 45 mm, number of revolution of a rubbing roll 1500 rpm, transfer speed 1 m/min). The solution of a liquid crystalline composition was applied onto the rubbed surface of the polyester film with a spin coater and dried at 80° C. for 1 minute, and the liquid crystalline composition was irradiated with a high-pressure mercury lamp (630 mJ/cm$^2$) in an atmosphere replaced with a nitrogen gas to harden to prepare a film having a retardation element. The prepared retardation element had a thickness of 4 μm. The retardation value of the retardation element obtained after removing the polyester film was measured with an automatic birefringence analyzer (KOBRA-21ADH manufactured by Oji Scientific Instruments) to find that the retardation value at a wavelength of 540 nm was 270 nm.

(3) Preparation of Laminated Glass

A release film on one side of an acrylic adhesive layer A sandwiched between two release films was peeled off and the exposed adhesive layer A was bonded to a retardation element surface of the obtained film having a retardation element (120 mm long and 120 mm wide). Next, the polyester film was peeled off from the retardation element, and a release film on one side of an acrylic adhesive layer B sandwiched between two release films was peeled off and the exposed adhesive layer B was bonded to the retardation element to prepare a retardation element laminate in which a release film/the adhesive layer A/the retardation element/the adhesive layer B/a release film are laminated in this order.

Furthermore, the release film on the adhesive layer A side of the obtained retardation element laminate was peeled off and the exposed adhesive layer A was bonded to the obtained interlayer film for a laminated glass so as to align the center of the retardation element with the center of the interlayer film for a laminated glass to prepare a laminate for a laminated glass.

Here, the adhesive layer A is an adhesive layer which is formed of the adhesive 5 prepared by cross-linking a polymer, obtained by copolymerizing butyl acrylate and acrylic acid, with an isocyanate cross-linking agent. The glass transition temperature of the adhesive 5 was −50° C. and the content of acrylic acid was 10 parts by weight with respect to 100 parts by weight of the whole monomer components.

The adhesive layer B is an adhesive layer which is formed of the adhesive 5 prepared by cross-linking a polymer, obtained by copolymerizing butyl acrylate and acrylic acid, with an isocyanate cross-linking agent.

In addition, the glass transition temperature was measured by use of a viscoelasticity measuring apparatus (manufactured by TA Instruments Co., Ltd., ARES). The glass transition temperature was measured under the conditions of a measured temperature range of −100 to 180° C., a temperature scanning rate of 5° C./min, a parallel plate of 25 mmφ, a strain amount of 10% and an angular velocity of 1 rad/sec.

A release film on the adhesive layer B side of the obtained laminate for a laminated glass was peeled off and the resulting laminate for a laminated glass was sandwiched between two clear glass plates (300 mm long, 300 mm wide and 2.5 mm thick). Thereafter, the laminate for a laminated glass sandwiched between the glass plates was put in a rubber bag and the inside of the bag was evacuated to preliminarily bond the laminate for a laminated glass at 100° C. The preliminarily bonded laminated glass was heated and pressurized under the conditions of 140° C. and a pressure of 1.3 MPa for 20 minutes using an autoclave to perform full bonding to prepare a laminated glass shown in FIG. 1.

EXAMPLES 2 TO 41 AND COMPARATIVE EXAMPLES 1 TO 23

Laminates for a laminated glass and laminated glasses were prepared in the same manner as in Example 1 except for changing the kinds and the mixed amounts of the plasticizer and the ultraviolet absorber, the kind and the mixed amount of the hindered amine compound, and the kind of the adhesive layer as indicated in Tables 1 and 2.

The compounds used in examples and comparative examples are shown below.

(Plasticizer)
Triethylene glycol di-2-ethylbutyrate (3 GH)
(Ultraviolet Absorber)
Benzotriazole compound (TINUVIN 326 produced by Ciba-Geigy Ltd.)
Benzotriazole compound (TINUVIN 328 produced by Ciba-Geigy Ltd.)
Benzophenone compound (ADEKA 1413 produced by Adeka Corporation)
Malonic ester compound (Hostavin PR-25 produced by Clariant)
Oxanilide compound (Sanduvor VSU produced by Clariant)
Triazine compound (TINUVIN 400 produced by Ciba-Geigy Ltd.)
(Hindered Amine Compound)
Hindered amine compound (LA-63P produced by Adeka Corporation)
Hindered amine compound (TINUVIN 144 produced by Ciba-Geigy Ltd.)
(Adhesive Layer)
Adhesive 1 (an adhesive prepared by cross-linking a polymer, obtained by copolymerizing butyl acrylate, methyl acrylate, methyl methacrylate and acrylic acid, with an isocyanate cross-linking agent; the glass transition temperature of the adhesive was −20° C.)
Adhesive 2 (an adhesive prepared by cross-linking a polymer, obtained by copolymerizing butyl acrylate, methyl acrylate, N,N-dimethylacrylamide and 2-hydroxyethylacrylate, with an isocyanate cross-linking agent; the glass transition temperature of the adhesive was −30° C.)
Adhesive 3 (an adhesive prepared by cross-linking a polymer, obtained by copolymerizing 2-ethylhexyl acrylate and 2-hydroxyethylacrylate, with an isocyanate cross-linking agent, the glass transition temperature of the adhesive was −70° C.)
Adhesive 4 (an adhesive prepared by cross-linking a polymer, obtained by copolymerizing butyl acrylate, acrylic acid and 2-hydroxyethylmethacrylate, with an isocyanate crosslinking agent; the glass transition temperature of the adhesive was −45° C.; the content of acrylic acid was 3 parts by weight with respect to 100 parts by weight of the whole monomer components)

Adhesive 5 (an adhesive prepared by cross-linking a polymer, obtained by copolymerizing butyl acrylate and acrylic acid, with an isocyanate cross-linking agent; the glass transition temperature of the adhesive was −50° C.)

(Evaluation)

The following evaluation was performed on the laminated glasses obtained in examples and comparative examples. The results of the evaluation are shown in Tables 1, 2 and 3.

(1) Measurement of Change in Retardation

The obtained laminated glass was irradiated with ultraviolet light for 1000 hours and then a retardation value at a wavelength of 540 nm was measured with an automatic birefringence analyzer (KOBRA-21ADH manufactured by Oji Scientific Instruments) by the method according to JIS R 3211 and JIS R 3212. A change in the retardation between before and after the ultraviolet irradiation was calculated from the following equation.

Change rate(%)=[{(retardation value after ultraviolet irradiation)−(initial retardation value)}/(initial retardation value)]×100

Here, the laminated glass was irradiated with ultraviolet light from a side of the glass plate which is not in contact with the adhesive layer B.

The laminated glass in which the obtained change rate (%) of the change in retardation was 0% or more and less than 3% was rated as "⊚" (double circle), the laminated glass in which the change rate was 3% or more and less than 6% was rated as "o" (circle), the laminated glass in which the change rate was 6% or more and less than 8% was rated as "Δ" (triangle), and the laminated glass in which the change rate was 8% or more was rated as "x" (cross).

(2) Evaluation of Impact Resistance

The impact resistance of the obtained laminated glass was evaluated by the method according to JIS R 3211 and JIS R 3212. An accepted laminated glass was rated as "o" (circle) and a rejected laminated glass was rated as "x" (cross).

Here, a rigid sphere was dropped on the glass plate which is not in contact with the adhesive layer B.

(3) Haze Value

Haze of the obtained laminated glass was measured according to JIS K 7105 using an integrating type turbidity meter (manufactured by Tokyo Denshoku CO., LTD.).

Here, the haze of a site where the glass plate, the interlayer film for a laminated glass, the adhesive layer A, the retardation element, the adhesive layer B and the glass plate are laminated was measured.

TABLE 1

| | Thermoplastic resin | Plasticizer | | Ultraviolet absorber | | | | | | Hindered amine compound | | | | Evaluation | | |
| | | | | Benzotriazole | | Benzophenone | Malonic | Oxanilide | Triazine | High molecular weight | Low molecular weight | | | | | |
| | Polyvinyl butyral | 3GO | 3GH | Tinuvin 326 | Tinuvin 328 | ADEKA 1413 | ester PR-25 | Sanduvor VSU | Tinuvin 400 | ADEKA LA-63P | Tinuvin 144 | Adhesive layer A | Adhesive layer B | Change in retardation (%) | Impact resistance | Haze |
|---|---|---|---|---|---|---|---|---|---|---|---|---|---|---|---|---|
| Example 1 | 100 | 40 | — | 0.8 | — | — | — | — | 0.8 | — | 0.1 | 5 | 5 | ○ | ○ | 0.4 |
| Example 2 | 100 | 40 | — | — | 1.2 | — | — | — | 0.8 | 0.1 | — | 5 | 5 | ⊚ | ○ | 0.4 |
| Example 3 | 100 | 40 | — | 0.8 | 0.35 | — | — | — | 1.2 | — | 0.1 | 5 | 5 | ⊚ | ○ | 0.4 |
| Example 4 | 100 | 40 | — | — | 1.2 | — | — | — | 1 | — | 0.1 | 5 | 5 | ⊚ | ○ | 0.4 |
| Example 5 | 100 | 40 | — | — | 1.4 | — | — | — | 2 | — | — | 5 | 5 | ⊚ | ○ | 0.4 |
| Example 6 | 100 | 40 | — | — | 1.4 | — | — | — | 0.8 | — | — | 5 | 5 | ⊚ | ○ | 0.4 |
| Example 7 | 100 | 40 | — | — | 0.8 | — | — | — | 2 | — | — | 5 | 5 | ⊚ | ○ | 0.4 |
| Example 8 | 100 | 40 | — | — | 0.8 | — | — | — | 0.8 | — | 0.1 | 5 | 5 | ○ | ○ | 0.4 |
| Example 9 | 100 | — | 40 | 0.8 | 0.35 | — | — | — | 1 | — | 0.1 | 5 | 5 | ○ | ○ | 0.4 |
| Example 10 | 100 | 40 | — | 0.8 | — | — | 0.2 | — | 0.6 | — | — | 1 | 2 | ⊚ | ○ | 0.4 |
| Example 11 | 100 | 40 | — | 0.8 | — | — | 0.4 | 0.4 | — | — | — | 1 | 2 | ⊚ | ○ | 0.4 |
| Example 12 | 100 | 40 | — | 0.8 | — | — | — | 0.8 | — | — | — | 1 | 2 | ○ | ○ | 0.3 |
| Example 13 | 100 | 40 | — | 0.8 | — | — | — | 1.4 | — | — | — | 5 | 5 | ⊚ | ○ | 0.4 |
| Example 14 | 100 | 40 | — | — | 1.2 | — | — | 0.8 | — | — | 0.1 | 5 | 5 | ⊚ | ○ | 0.4 |
| Example 15 | 100 | 40 | — | — | 1.4 | — | — | 0.8 | — | — | 0.1 | 5 | 5 | ⊚ | ○ | 0.4 |
| Example 16 | 100 | 40 | — | — | 1.4 | — | — | 1.4 | — | — | 0.1 | 5 | 5 | ⊚ | ○ | 0.4 |
| Example 17 | 100 | 40 | — | 0.8 | 0.35 | — | — | 0.8 | — | — | 0.1 | 5 | 5 | ⊚ | ○ | 0.4 |
| Example 18 | 100 | 40 | — | 0.8 | 0.35 | — | — | 0.8 | 0.35 | 0.1 | — | 5 | 5 | ⊚ | ○ | 0.4 |
| Example 19 | 100 | 40 | — | 0.8 | 0.35 | — | — | 0.6 | 0.6 | — | 0.1 | 5 | 5 | ⊚ | ○ | 0.4 |
| Example 20 | 100 | 40 | — | 0.8 | 0.35 | — | — | 0.35 | 0.8 | — | 0.1 | 5 | 5 | ⊚ | ○ | 0.4 |

TABLE 2

| | Thermo-plastic resin Poly-vinyl butyral | Plasticizer 3GO | Plasticizer 3GH | Ultraviolet absorber Benzo-triazole Tinuvin 326 | Ultraviolet absorber Benzo-triazole Tinuvin 328 | Ultraviolet absorber Benzo-phenone ADEKA 1413 | Ultraviolet absorber Malonic ester PR-25 | Ultraviolet absorber Oxanilide Sanduvor VSU | Ultraviolet absorber Triazine Tinuvin 400 | Hindered amine compound High molecular weight ADEKA LA-63P | Hindered amine compound Low molecular weight Tinuvin 144 | Adhesive layer A | Adhesive layer B | Evaluation Change in retardation (%) | Evaluation Impact resistance | Haze |
|---|---|---|---|---|---|---|---|---|---|---|---|---|---|---|---|---|
| Example 21 | 100 | 40 | — | 0.8 | — | — | — | 0.4 | 0.6 | — | — | 5 | 5 | ⊚ | ○ | 0.4 |
| Example 22 | 100 | 40 | — | 0.8 | 0.35 | — | — | 0.8 | 0.35 | 0.1 | — | 5 | 5 | ⊚ | ○ | 0.4 |
| Example 23 | 100 | 40 | — | 0.8 | 0.35 | — | — | 0.8 | 0.35 | — | 0.1 | 5 | 5 | ⊚ | ○ | 0.4 |
| Example 24 | 100 | 40 | — | 0.8 | 0.35 | — | — | 0.58 | 0.58 | — | 0.1 | 5 | 5 | ⊚ | ○ | 0.4 |
| Example 25 | 100 | 40 | — | 0.8 | 0.35 | — | — | 0.35 | 0.8 | — | 0.1 | 5 | 5 | ⊚ | ○ | 0.4 |
| Example 26 | 100 | 40 | — | 0.8 | — | — | 0.8 | — | — | — | — | 1 | 2 | ○ | ○ | 0.3 |
| Example 27 | 100 | 40 | — | 0.8 | — | — | 1.2 | — | — | — | — | 1 | 2 | ⊚ | ○ | 0.4 |
| Example 28 | 100 | 40 | — | — | 1.4 | — | 0.8 | — | — | 0.1 | — | 1 | 2 | ⊚ | ○ | 0.4 |
| Example 29 | 100 | 40 | — | — | 1.4 | — | 1.2 | — | — | — | — | 1 | 2 | ⊚ | ○ | 0.4 |
| Example 30 | 100 | 40 | — | — | — | 0.8 | — | — | 0.8 | — | 0.1 | 5 | 5 | ○ | ○ | 0.3 |
| Example 31 | 100 | 40 | — | — | — | 1.6 | — | — | 0.8 | — | — | 5 | 5 | ○ | ○ | 0.4 |
| Example 32 | 100 | 40 | — | — | — | 0.8 | — | — | 2.0 | — | — | 5 | 5 | ○ | ○ | 0.4 |
| Example 33 | 100 | 40 | — | — | — | 1.6 | — | — | 2.0 | — | — | 5 | 5 | ○ | ○ | 0.4 |
| Example 34 | 100 | 40 | — | — | — | 0.8 | — | 0.8 | — | 0.1 | — | 5 | 5 | ○ | ○ | 0.3 |
| Example 35 | 100 | 40 | — | — | — | 1.6 | — | 1 | — | — | — | 5 | 5 | ○ | ○ | 0.4 |
| Example 36 | 100 | 40 | — | — | — | 1.6 | — | 1.4 | — | — | — | 5 | 5 | ○ | ○ | 0.5 |
| Example 37 | 100 | 40 | — | — | — | 0.8 | — | 1.4 | — | — | — | 5 | 5 | ○ | ○ | 0.4 |
| Example 38 | 100 | 40 | — | — | — | 0.8 | 0.8 | — | — | — | — | 1 | 2 | ○ | ○ | 0.3 |
| Example 39 | 100 | 40 | — | — | — | 0.8 | 1.2 | — | — | — | — | 1 | 2 | ○ | ○ | 0.4 |
| Example 40 | 100 | 40 | — | — | — | 1.6 | 1.2 | — | — | — | — | 1 | 2 | ○ | ○ | 0.4 |
| Example 41 | 100 | 40 | — | — | — | 1.6 | 0.8 | — | — | — | — | 1 | 2 | ○ | ○ | 0.4 |

TABLE 3

| | Thermo-plastic resin Poly-vinyl butyral | Plasticizer 3GO | Plasticizer 3GH | Ultraviolet absorber Benzo-triazole Tinuvin 326 | Ultraviolet absorber Benzo-triazole Tinuvin 328 | Ultraviolet absorber Benzo-phenone ADEKA 1413 | Ultraviolet absorber Malonic ester PR-25 | Ultraviolet absorber Oxanilide Sanduvor VSU | Ultraviolet absorber Triazine Tinuvin 400 | Hindered amine compound High molecular weight ADEKA LA-63P | Hindered amine compound Low molecular weight Tinuvin 144 | Adhesive layer A | Adhesive layer B | Evaluation Change in retardation (%) | Evaluation Impact resistance | Haze |
|---|---|---|---|---|---|---|---|---|---|---|---|---|---|---|---|---|
| Comparative Example 1 | 100 | 40 | — | 0.2 | — | — | — | — | — | — | — | 1 | 2 | X | ○ | 0.2 |
| Comparative Example 2 | 100 | 40 | — | 0.8 | — | — | — | — | — | — | — | 1 | 2 | X | ○ | 0.2 |
| Comparative Example 3 | 100 | 40 | — | — | — | — | 0.2 | — | — | — | — | 1 | 2 | X | ○ | 0.2 |
| Comparative Example 4 | 100 | 40 | — | — | — | — | 0.8 | — | — | — | — | 1 | 2 | X | ○ | 0.3 |
| Comparative Example 5 | 100 | 40 | — | 0.1 | — | — | 0.1 | — | — | — | — | 1 | 2 | X | ○ | 0.2 |
| Comparative Example 6 | 100 | 40 | — | 0.2 | — | — | 0.2 | — | — | — | — | 1 | 2 | X | ○ | 0.3 |
| Comparative Example 7 | 100 | 40 | — | 0.8 | — | — | — | 0.3 | — | 0.02 | — | 1 | 2 | X | ○ | 0.4 |
| Comparative Example 8 | 100 | 40 | — | 0.1 | — | — | 0.6 | — | — | — | — | 1 | 2 | X | ○ | 0.3 |
| Comparative Example 9 | 100 | 40 | — | 0.8 | — | — | 0.3 | — | — | — | — | 1 | 2 | X | ○ | 0.3 |
| Comparative Example 10 | 100 | 40 | — | 0.6 | — | — | 0.4 | — | — | 0.1 | — | 5 | 5 | X | ○ | 0.4 |
| Comparative Example 11 | 100 | 40 | — | 0.4 | — | — | 0.6 | — | — | 0.1 | — | 5 | 5 | X | ○ | 0.4 |
| Comparative Example 12 | 100 | 40 | — | 0.8 | — | — | — | — | 0.6 | — | — | 5 | 5 | X | ○ | 0.3 |
| Comparative Example 13 | 100 | 40 | — | 0.8 | — | — | — | 0.6 | — | — | — | 5 | 5 | X | ○ | 0.4 |
| Comparative | 100 | 40 | — | 0.8 | — | — | 0.6 | — | — | — | — | 1 | 2 | X | ○ | 0.4 |

TABLE 3-continued

| | Thermoplastic resin | Plasticizer | | Ultraviolet absorber | | | | | | Hindered amine compound | | | | Evaluation | | |
|---|---|---|---|---|---|---|---|---|---|---|---|---|---|---|---|---|
| | | | | Benzotriazole | | Benzophenone | Malonic | Oxanilide | Triazine | High molecular weight | Low molecular weight | | | Change in | | |
| | Polyvinyl butyral | 3GO | 3GH | Tinuvin 326 | Tinuvin 328 | ADEKA 1413 | ester PR-25 | Sanduvor VSU | Tinuvin 400 | ADEKA LA-63P | Tinuvin 144 | Adhesive layer A | Adhesive layer B | retardation (%) | Impact resistance | Haze |
|---|---|---|---|---|---|---|---|---|---|---|---|---|---|---|---|---|
| Example 14 | | | | | | | | | | | | | | | | |
| Comparative Example 15 | 100 | 40 | — | 0.6 | — | — | — | — | 0.8 | — | — | 5 | 5 | X | ○ | 0.3 |
| Comparative Example 16 | 100 | 40 | — | 0.6 | — | — | — | 0.8 | — | — | — | 5 | 5 | X | ○ | 0.3 |
| Comparative Example 17 | 100 | 40 | — | 0.6 | — | — | 0.8 | — | — | — | — | 1 | 2 | X | ○ | 0.4 |
| Comparative Example 18 | 100 | 40 | — | — | 0.8 | — | — | — | 0.6 | — | — | 5 | 5 | X | ○ | 0.3 |
| Comparative Example 19 | 100 | 40 | — | — | 0.8 | — | — | 0.6 | — | — | — | 5 | 5 | X | ○ | 0.3 |
| Comparative Example 20 | 100 | 40 | — | — | 0.8 | — | 0.6 | — | — | — | — | 1 | 2 | X | ○ | 0.4 |
| Comparative Example 21 | 100 | 40 | — | — | — | 0.6 | — | — | 0.8 | — | — | 5 | 5 | X | ○ | 0.3 |
| Comparative Example 22 | 100 | 40 | — | — | — | 0.6 | — | 0.8 | — | — | — | 5 | 5 | X | ○ | 0.3 |
| Comparative Example 23 | 100 | 40 | — | — | — | 0.6 | 0.8 | — | — | — | — | 5 | 5 | X | ○ | 0.4 |

Industrial Applicability

In accordance with the present invention, it is possible to provide a laminate for a laminated glass which is used as a head-up display (HUD) and is not deteriorated even if exposed to light, and with which a laminated glass having excellent impact resistance can be prepared. Further, in accordance with the present invention, it is possible to provide an interlayer film for a laminated glass to be used in the laminate for a laminated glass.

Explanation of Symbols

| | |
|---|---|
| 1 | glass on the vehicle exterior side |
| 2 | interlayer film for a laminated glass |
| 3 | adhesive layer |
| 4 | retardation element |
| 5 | adhesive layer |
| 6 | glass on the vehicle interior side |
| 7 | laminate for a laminated glass |

The invention claimed is:

1. A laminate for a laminated glass,
wherein an interlayer film for a laminated glass and a retardation element sandwiched between adhesive layers are laminated,
said interlayer film for a laminated glass comprises a thermoplastic resin and an ultraviolet absorber,
said interlayer film for a laminated glass comprises, as said ultraviolet absorber, a benzotriazole compound or a benzophenone compound, and at least one compound selected from the group consisting of a malonic ester compound, an oxanilide compound and a triazine compound,
the sum of the contents of said malonic ester compound, said oxanilide compound and said triazine compound is 0.8 parts by weight or more and the sum of the contents of said benzotriazole compound or said benzophenone compound is 0.8 parts by weight or more with respect to 100 parts by weight of said thermoplastic resin and
said adhesive layer comprises an adhesive having a glass transition temperature of −20° C. or lower.

2. The laminate for a laminated glass according to claim 1, wherein the interlayer film for a laminated glass comprises the triazine compound and the benzotriazole compound as the ultraviolet absorber, and the content of said triazine compound is 0.8 to 2.0 parts by weight and the content of said benzotriazole compound is 0.8 to 1.4 parts by weight with respect to 100 parts by weight of the thermoplastic resin.

3. The laminate for a laminated glass according to claim 1, wherein the interlayer film for a laminated glass comprises the oxanilide compound and the benzotriazole compound as the ultraviolet absorber, and the content of said oxanilide compound is 0.8 to 1.4 parts by weight and the content of said benzotriazole compound is 0.8 to 1.4 parts by weight with respect to 100 parts by weight of the thermoplastic resin.

4. The laminate for a laminated glass according to claim 1, wherein the interlayer film for a laminated glass comprises the malonic ester compound and the benzotriazole compound as the ultraviolet absorber, and the content of said malonic ester compound is 0.8 to 1.2 parts by weight and the content of said benzotriazole compound is 0.8 to 1.4 parts by weight with respect to 100 parts by weight of the thermoplastic resin.

5. The laminate for a laminated glass according to claim 1, wherein the interlayer film for a laminated glass comprises the triazine compound and the benzophenone compound as the ultraviolet absorber, and the content of said triazine compound is 0.8 to 2.0 parts by weight and the content of said benzophenone compound is 0.8 to 1.6 parts by weight with respect to 100 parts by weight of the thermoplastic resin.

6. The laminate for a laminated glass according to claim 1, wherein the interlayer film for a laminated glass comprises the oxanilide compound and the benzophenone compound as the ultraviolet absorber, and the content of said oxanilide compound is 0.8 to 1.4 parts by weight and the content of said benzophenone compound is 0.8 to 1.6 parts by weight with respect to 100 parts by weight of the thermoplastic resin.

7. The laminate for a laminated glass according to claim 1, wherein the interlayer film for a laminated glass comprises the malonic ester compound and the benzophenone compound as the ultraviolet absorber, and the content of said malonic ester compound is 0.8 to 1.2 parts by weight and the content of said benzophenone compound is 0.8 to 1.6 parts by weight with respect to 100 parts by weight of the thermoplastic resin.

8. The laminate for a laminated glass according to claim 1, wherein the interlayer film for a laminated glass further comprises a hindered amine compound.

9. The laminate for a laminated glass according to claim 1, wherein the adhesive layer comprises an acrylic adhesive.

10. The laminate for a laminated glass according to claim 1, wherein the thermoplastic resin is a polyvinyl acetal resin.

11. The laminate for a laminated glass according to claim 10, wherein the interlayer film for a laminated glass further comprises a plasticizer.

12. An interlayer film for a laminated glass, comprising a thermoplastic resin and an ultraviolet absorber, wherein said interlayer film for a laminated glass comprises, as said ultraviolet absorber, a benzotriazole compound and a triazine compound, wherein a content of said triazine compound is 0.8 to 2.0 parts by weight and a content of said benzotriazole compound is 0.8 to 1.4 parts by weight with respect to 100 parts by weight of the thermoplastic resin.

13. An interlayer film for a laminated glass, comprising a thermoplastic resin and an ultraviolet absorber, wherein said interlayer film for a laminated glass comprises, as said ultraviolet absorber, a benzophenone compound and a triazine compound, wherein a content of said triazine compound is 0.8 to 2.0 parts by weight and a content of said benzophenone compound is 0.8 to 1.6 parts by weight with respect to 100 parts by weight of the thermoplastic resin.

* * * * *